Patented Feb. 28, 1939

2,148,928

UNITED STATES PATENT OFFICE 2,148,928

MOTHPROOFING COMPOSITION

Guy de Meuron, Basel, Switzerland, assignor to the firm of J. R. Geigy S. A., Basel, Switzerland No Drawing. Application March 7, 1938, Serial No. 194,513. In Germany March 12, 1937

6 Claims. (Cl. 167—37)

This invention relates to an improvement in or modification of the invention set forth in the specification Ser. No. 164,816 of Sept. 20, 1937.

That specification describes a process for protecting wool, hair, furs, feathers and the like goods from damage by moths, involving the use of certain halogen-substituted arylsulphone- or arylsulphoxide-derivatives. The compounds used contain a $SO_2$-group or SO-group linked on one side to a halogen substituted benzene radicle and on the other side to R, SR or $SO_2R$, in which R may be aryl, aralkyl or alkyl, and wherein the aralkyl or alkyl chains may be substituted or interrupted by further atoms or atom-groups, for instance halogen, O, S, SO, $SO_2$, NH, CO, NH—CO or the like.

Further development of this process has shown that derivatives of arylsulphone compounds, which contain the $SO_2$-group not linked to the radicle SR but to the atom grouping OR, that is to say arylsulphonic acid esters, are outstandingly suitable for protecting animal fibres from damage by moths. In this case R indicates an aryl radicle of the benzene and naphthalene series without any water solubilizing group which can be unsubstituted or suitably substituted. The aromatic radicle, which carries the $SO_2$-group, is so selected according to the process of the parent patent that it is halogen-substituted.

These compounds can be produced by the usual processes, especially by condensation of the corresponding aromatic acid chlorides with aromatic hydroxy-compounds, such as phenols and naphthols.

As examples of the numerous possible combinations there may be mentioned, amongst the halogenated aromatic acid chlorides: chlorobenzene- and dichlorobenzene-, chlorotoluene sulphochlorides; amongst the hydroxy-aryl compounds: phenols, such as chlorophenols; naphthols, dihydroxy - diaryl - sulphones, dihydroxydiphenyl-sulphoxides, hydroxy- and dihydroxy-diphenyls.

Even in low concentrations these compounds are suitable for protecting wool, furs, hair, feathers and the like goods from damage by moths.

The poisonous action of these halogenated sulphonic acid esters could not be foreseen and is very surprising, as in connection with the sulphonic acid group it is known that its introduction into suitable aromatic compounds mostly strongly diminishes or completely nullifies the poisonous character.

The most suitable for the process according to the present invention are solutions of the sulphonic acid esters in cheap organic solvents such as alcohols, acetone and the like. The substances to be protected can be impregnated by spraying, dipping or coating. The aryl sulphonic acid esters may however also be used in any usual manner for the purpose of destruction of animal pests, alone or with other already known protecting media.

*Example*

5 parts of p-chlorobenzene sulphonic acid ester of p-chlorophenol are dissolved in 995 parts of acetone or alcohol, wool, furs and the like are treated by dipping, centrifuged and dried. The goods thus treated are moth proof; even more diluted solutions suffice in order to obtain a good protection.

Instead of the p-chlorobenzene sulphonic acid ester of the p-chlorophenol the following compounds may be used, for example:

p-Chlorobenzene sulphonic acid ester of phenol, o-, m- and p-cresol and their mixture, p-Chlorobenzene sulphonic acid ester of o-chlorophenol, p-Chlorobenzene sulphonic acid ester of dichlorophenol, p-Chlorobenzene sulphonic acid ester of p-amylphenol, Di-(p-chlorobenzene sulphonic acid ester) of dihydroxy-diphenyl, Di-(p-chlorobenzene sulphonic acid ester) of dihydroxy-diphenyl sulphone, Di-(p-chlorobenzene sulphonic acid ester) of diphenolisatin, 3, 4-dichlorobenzene sulphonic acid ester of o- or p-chlorophenol, 2, 5-dichlorobenzene sulphonic acid ester of o- or p-chlorophenol.

What I claim is:

1. A moth-proofing composition containing as its essential active ingredient an ester of a chlorobenzene-sulphonic acid with a phenolic body of the benzene series containing on each aryl nucleus only one hydroxy group and no water solubilizing group.

2. A moth-proofing composition containing as its essential active ingredient an ester of a p-chlorobenzene sulphonic acid with a monohydric phenolic body of the benzene series containing no water solubilizing group.

3. A moth-proofing composition containing as its essential active ingredient an ester of a p-chlorobenzene sulphonic acid with a chlorophenol.

4. A moth-proofing composition containing as its essential active ingredient an ester of the following formula:

5. A moth-proofing composition containing as its essential active ingredient an ester of the following formula:

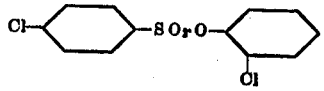

6. A moth-proofing composition containing as its essential active ingredient an ester of the following formula:

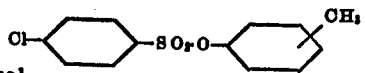

the radical

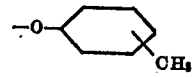

corresponding to that of crude cresol consisting of o-, m- and p-cresol.

GUY DE MEURON.